US011978373B1

(12) United States Patent
Huang et al.

(10) Patent No.: US 11,978,373 B1
(45) Date of Patent: May 7, 2024

(54) PIXEL DETECTION DEVICE AND PIXEL DETECTION METHOD

(71) Applicant: AUO Corporation, Hsin-Chu (TW)

(72) Inventors: Shu-Hao Huang, Hsin-Chu (TW); Sung-Yu Su, Hsin-Chu (TW); Rwei-Shan Chen, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/450,719

(22) Filed: Aug. 16, 2023

(30) Foreign Application Priority Data

Apr. 4, 2023 (CN) ......................... 202310352137.2

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2300/0852* (2013.01); *G09G 2300/0861* (2013.01); *G09G 2310/08* (2013.01); *G09G 2330/12* (2013.01)

(58) Field of Classification Search
CPC .. G09G 3/006; G09G 3/32; G09G 2300/0852; G09G 2300/0861; G09G 2310/08; G09G 2330/12
See application file for complete search history.

(56) References Cited

U.S. PATENT DOCUMENTS 7,355,574 B1 * 4/2008 Leon .................... G09G 3/3233 345/82
11,335,248 B1 5/2022 Huang
2008/0036703 A1 * 2/2008 Wang ................... G09G 3/3225 345/76
2020/0193902 A1 6/2020 Hsu
2021/0383757 A1 12/2021 Hsu
2022/0238069 A1 7/2022 Huang
2023/0419872 A1 * 12/2023 Chen ...................... G01R 31/52

FOREIGN PATENT DOCUMENTS

CN 110097842 A 8/2019
TW 202223860 A 6/2022

OTHER PUBLICATIONS

Lin et al. "Display Panel and Display Device" U.S. Appl. No. 18/147,730, filed Dec. 29, 2022, USPTO.

* cited by examiner

*Primary Examiner* — Abhishek Sarma
(74) *Attorney, Agent, or Firm* — WPAT, P.C

(57) ABSTRACT

A pixel detection device includes a data line, a pixel circuit, and a detection circuit. Pixel circuit is coupled to a system high voltage source, a system low voltage source, and a first reference voltage source. Detection circuit is coupled to data line and pixel circuit, and is configured to receive a driving signal and a detection control signal. Detection circuit forms a first detection loop with the system low voltage source and the data line so as to detect whether the pixel circuit is abnormal according to the driving signal and the detection control signal in a first stage. Detection circuit forms a second detection loop with the first reference voltage source, the system low voltage source, the pixel circuit, and the data line so as to detect whether the pixel circuit is abnormal according to the driving signal and the detection control signal in a second stage.

20 Claims, 16 Drawing Sheets

PIXEL DETECTION DEVICE AND PIXEL DETECTION METHOD

CROSS-REFERENCE TO RELATED APPLICATION

This application claims priority to China Application Serial Number 202310352137.2, filed on Apr. 4, 2023, which is herein incorporated by reference in its entirety.

BACKGROUND

Field of Invention

The present disclosure relates to a detection device and a detection method. More particularly, the present disclosure relates to a pixel detection device and a pixel detection method.

Description of Related Art

Conventional mini light light-emitting diodes (mini LED) require relatively large driving currents. Power supply voltage that generates driving currents is prone to current errors, which will cause voltages of each pixel to be different, resulting in errors in an output current.

In addition, in conventional pixel driving circuits, when the micro light-emitting diode needs to output high brightness, a driving transistor needs to generate a large current. When a large current flows through a path between two power supply voltages, transistors on the path tend to enter a linear region according to a large current, making it difficult to control a driving current.

Furthermore, conventional pixel driving circuits only have an internal function of self-compensation circuit. If a pixel driving circuit is abnormal, an internal function of self-compensation circuit will not work.

For the foregoing reason, there is a need to provide a suitable pixel detection device to solve the problems of the prior art.

SUMMARY

One aspect of the present disclosure provides a pixel detection device. The pixel detection device includes a data line, a pixel circuit and a detection circuit. The pixel circuit is coupled to a system high voltage source, a system low voltage source and a first reference voltage source. The detection circuit is coupled to the data line and the pixel circuit, and is configured to receive a driving signal and a detection control signal. The detection circuit forms a first detection loop with the system low voltage source and the data line, so as to detect whether the pixel circuit is abnormal according to the driving signal and the detection control signal. The detection circuit forms a second detection loop with the first reference voltage source, the system low voltage source, the pixel circuit and the data line, so as to detect whether the pixel circuit is abnormal according to the driving signal and the detection control signal.

Another aspect of the present disclosure provides a pixel detection device. The pixel detection device includes a signal line, a pixel circuit and a detection circuit. The pixel circuit is coupled to a system high voltage source, a system low voltage source and a first reference voltage source. The detection circuit is coupled to the signal line, the pixel circuit and the first reference voltage source, and is configured to receive a driving signal and a detection control signal. The detection circuit forms a first detection loop with the first reference voltage source, the pixel circuit and the signal line, so as to detect whether the pixel circuit is abnormal according to the first driving signal and the detection control signal in a first stage. The detection circuit forms a second detection loop with the, pixel circuit and the signal line, so as to detect whether the pixel circuit is abnormal according to the first driving signal in a second stage.

Another aspect of the present disclosure provides a pixel detection method. The pixel detection method is adapted to a pixel detection device. The pixel detection device includes a signal line, a pixel circuit and a detection circuit. The pixel circuit is coupled to a system high voltage source, a system low voltage source and a first reference voltage source. The detection circuit is coupled to the signal line and the pixel circuit. The pixel detection method includes following steps: inputting a first detection signal to the pixel circuit by the first reference voltage source in a first stage; receiving the first detection signal by the detection circuit and the signal line in the first stage, so as to determine whether the pixel circuit is abnormal according to the first detection signal; inputting a second detection signal to the pixel circuit by the system low voltage source in a second stage; and receiving the second detection signal by the detection circuit and the signal line in the second stage, so as to determine whether the pixel circuit is abnormal according to the second detection signal.

In view of the aforementioned shortcomings and deficiencies of the prior art, the present disclosure provides a pixel detection device and a pixel detection method, so that pixels can be detected or externally compensated by designed circuits of a pixel detection device, and a power consumption of a pixel detection device for display can be reduced.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
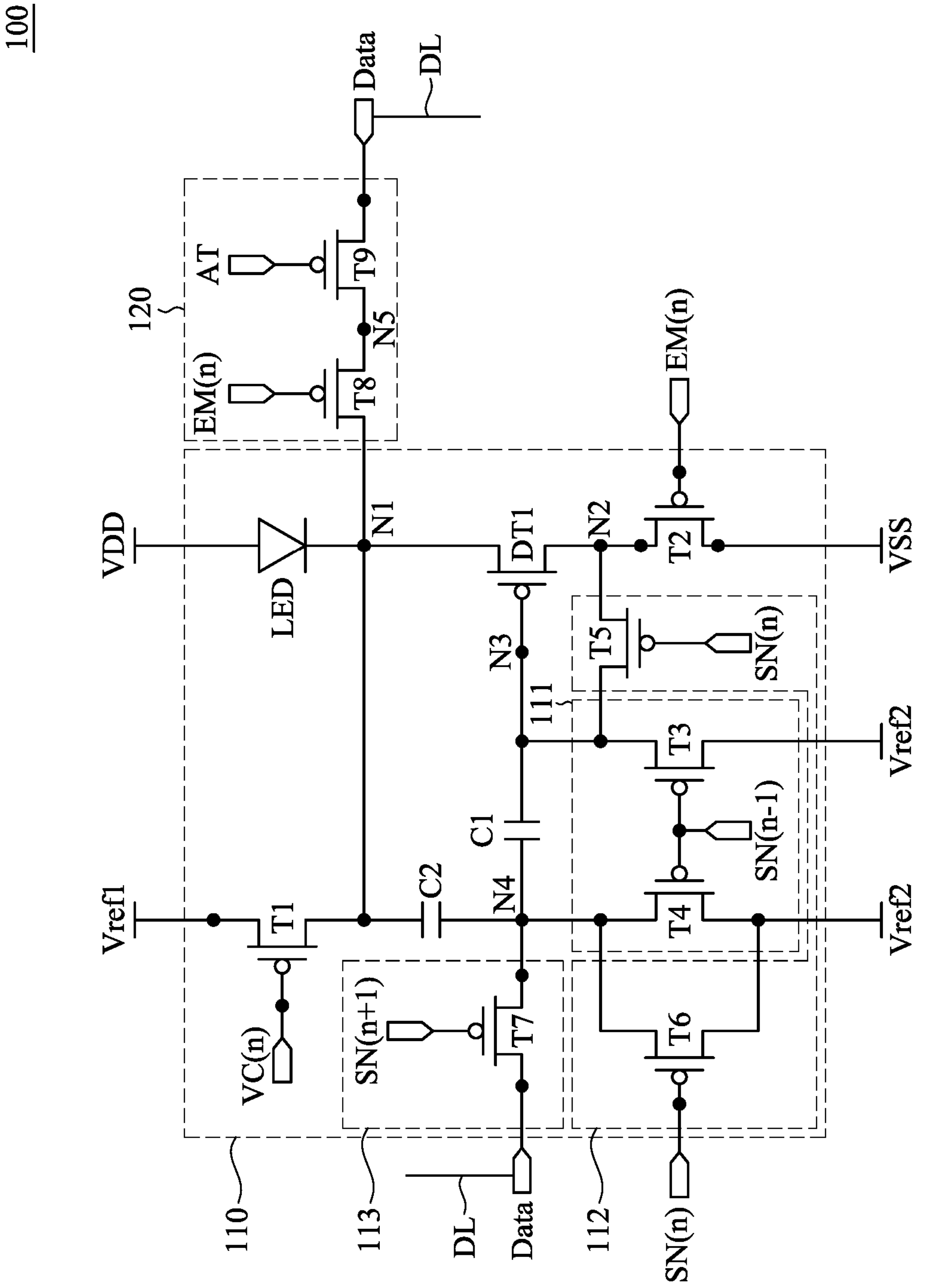
FIG. 1 depicts a schematic diagram of a pixel detection device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 depicts a schematic diagram of a pixel detection device 100 according to some embodiments of the present disclosure. In some embodiments, as shown in FIG. 1, the pixel detection device 100 includes a data line DL, a pixel circuit 110 and a detection circuit 120. The pixel circuit 110 is coupled to a system high voltage source VDD, a system low voltage source VSS, a first reference voltage source Vref1 and a second reference voltage source Vref2. The detection circuit 120 is coupled to the data line DL and the pixel circuit 110.

In some embodiments, the detection circuit 120 is configured to receive a driving signal EM(n) and a detection control signal AT. The detection circuit 120 forms a first detection loop (not shown in the figure) with the system low voltage source VSS and the data line DL, so as to detect whether the pixel circuit 110 is abnormal according to the driving signal EM(n) and the detection control signal AT in a first stage.

Then, the detection circuit 120 forms a second detection loop (not shown in the figure) with the first reference voltage source Vref1, the pixel circuit 110 and the data line DL, so as to detect whether the pixel circuit 110 is abnormal according to the driving signal EM(n) and the detection control signal AT.

It should be noted that an electronic device includes a plurality of pixel detection devices 100. Each pixel detection device 100 is equivalent to a display pixel.

In some embodiments, please refer to FIG. 1, the pixel circuit 110 includes a reset circuit 111, a compensation circuit 112, a writing circuit 113, a first node N1, a second node N2, a third node N3 and a fourth node N4, a light emitting element LED, a driving transistor DT1, a first transistor T1, a second transistor T2, a first capacitor C1 and a second capacitor C2.

In some embodiments, the reset circuit 111 is coupled to the third node N3, the fourth node N4 and a second reference voltage source Vref2, and is configured to reset the third node N3 to a second reference voltage of the second reference voltage source Vref2, so as to reset the first node N1 and the second node N2 to a system low voltage of the system low voltage source VSS through the driving transistor DT1.

In some embodiments, the compensation circuit 112 is coupled to the second node N2, the third node N3, the fourth node N4 and the reset circuit 111, and is configured to compensate the third node N3 to a first reference voltage of the first reference voltage source Vref1.

In some embodiments, the writing circuit 113 is coupled to the fourth node N4 and the data line DL, and is configured to receive a data voltage Data of the data line DL for writing into the third node N3 and the fourth node N4, so as to store the data voltage Data into the first capacitor C1.

In some embodiments, please refer to FIG. 1, and start form a top end and a right end of each of an element shown in the figure as a first end. The driving transistor DT1 includes a first terminal, a second terminal and a control terminal (i.e. a gate terminal of the driving transistor DT1). The first terminal of the driving transistor DT1 is coupled to the first node N1. The second terminal of the driving transistor DT1 is coupled to the second node N2. The control terminal of the driving transistor DT1 is coupled to the third node N3, and is configured to drive the light emitting element LED according to a voltage level of the third node N3. The first node N1, the second node N2 and the third node N3 are not the same point.

In some embodiments, please refer to FIG. 1, the first transistor T1 includes a first terminal, a second terminal and a control terminal (i.e. a gate terminal of the first transistor T1). The first terminal of the first transistor T1 is coupled to the first reference voltage source Vref1, and is configured to receive the system high voltage of the first reference voltage source Vref1. The second terminal of the first transistor T1 is coupled to the first node N1. The control terminal of the first transistor T1 is configured to receive a control signal VC(n). The first transistor T1 is conducted in response to the control signal VC(n).

In some embodiments, the second transistor T2 includes a first terminal, a second terminal and a control terminal (i.e. a gate terminal of the second transistor T2). The first terminal of the second transistor T2 is coupled to the driving transistor DT1. The second terminal of the second transistor T2 is coupled to the system low voltage source VSS. The control terminal of the second transistor T2 is configured to receive the driving signal EM(n). The second transistor T2 is conducted in response to the driving signal EM(n).

In some embodiments, the first capacitor C1 includes a first terminal and a second terminal. The first terminal of the first capacitor C1 is coupled to the third node N3. The second terminal of the first capacitor C1 is coupled to the fourth node N4. In some embodiments, the second capacitor C2 includes a first terminal and a second terminal. The first terminal of the second capacitor C2 is coupled to the first node N1 and the first transistor T1. The second terminal of the second capacitor C2 is coupled to the fourth node N4.

In some embodiments, the reset circuit 111 includes a third transistor T3 and a fourth transistor T4. In addition, the third transistor T3 includes a first terminal, a second terminal and a control terminal (i.e. a gate terminal of the third transistor T3). The first terminal of the third transistor T3 is coupled to the third node N3. The second terminal of the third transistor T3 is coupled to the second reference voltage source Vref2. The control terminal of the third transistor T3 is configured to receive a reset signal SN(n−1). The third transistor T3 is configured to reset the third node N3 in response to the reset signal SN(n−1).

Furthermore, the fourth transistor T4 includes a first terminal, a second terminal and a control terminal (i.e. a gate terminal of the fourth transistor T4). The first terminal of the fourth transistor T4 is coupled to the fourth node N4. The second terminal of the fourth transistor T4 is coupled to the second reference voltage source Vref2. The control terminal of the fourth transistor T4 is configured to receive the reset signal SN(n−1). The fourth transistor T4 is conducted in response to the reset signal SN(n−1).

In some embodiments, the compensation circuit 112 includes a fifth transistor T5 and a sixth transistor T6. In addition, the fifth transistor T5 includes a first terminal, a second terminal and a control terminal (i.e. a gate terminal of the fifth transistor T5). The first terminal of the fifth transistor T5 is coupled to the second node N2. The second terminal of the fifth transistor T5 is coupled to the third node N3. The control terminal of the fifth transistor T5 is configured to receive a compensation signal SN(n). The fifth transistor T5 is conducted in response to the compensation signal SN(n).

Furthermore, the sixth transistor T6 includes a first terminal, a second terminal and a control terminal (i.e. a gate terminal of the sixth transistor T6). The first terminal of the sixth transistor T6 is coupled to the fourth node N4. The second terminal of the sixth transistor T6 is coupled to the second reference voltage source Vref2. The control terminal of the sixth transistor T6 is configured receive the compensation signal SN(n). The sixth transistor T6 is conducted in response to the compensation signal SN(n).

In some embodiments, the writing circuit 113 includes a seventh transistor T7. The seventh transistor T7 includes a first terminal, a second terminal and a control terminal (i.e. a gate terminal of the seventh transistor T7). The first terminal of the seventh transistor T7 is coupled to the fourth node N4. The second terminal of the seventh transistor T7 is coupled to the data line DL. The control terminal of the seventh transistor T7 is configured to receive a writing signal SN(n+1). The seventh transistor T7 is conducted in response to the writing signal SN(n+1).

In some embodiments, the detection circuit 120 includes a fifth node N5, a first detection transistor T8 and a second detection transistor T9. In addition, the first detection transistor T8 includes a first terminal, a second terminal and a control terminal (i.e. a gate terminal of the first detection transistor T8). The first terminal of the first detection transistor T8 is coupled to the fifth node N5. The second terminal of the first detection transistor T8 is coupled to the first node N1 of the pixel circuit 110. The control terminal of the first detection transistor T8 is configured to receive the driving signal EM(n). The first detection transistor T8 is conducted in response to the driving signal EM(n).

Furthermore, the second detection transistor T9 includes a first terminal, a second terminal and a control terminal (i.e. a gate terminal of the second detection transistor T9). The first terminal of the second detection transistor T9 is coupled to the data line DL. The second terminal of the second detection transistor T9 is coupled to the first terminal of the first detection transistor T8. The control terminal of the second detection transistor T9 is configured to receive the detection control signal AT. The second detection transistor T9 is conducted in response to the detection control signal AT.

Figure 2:
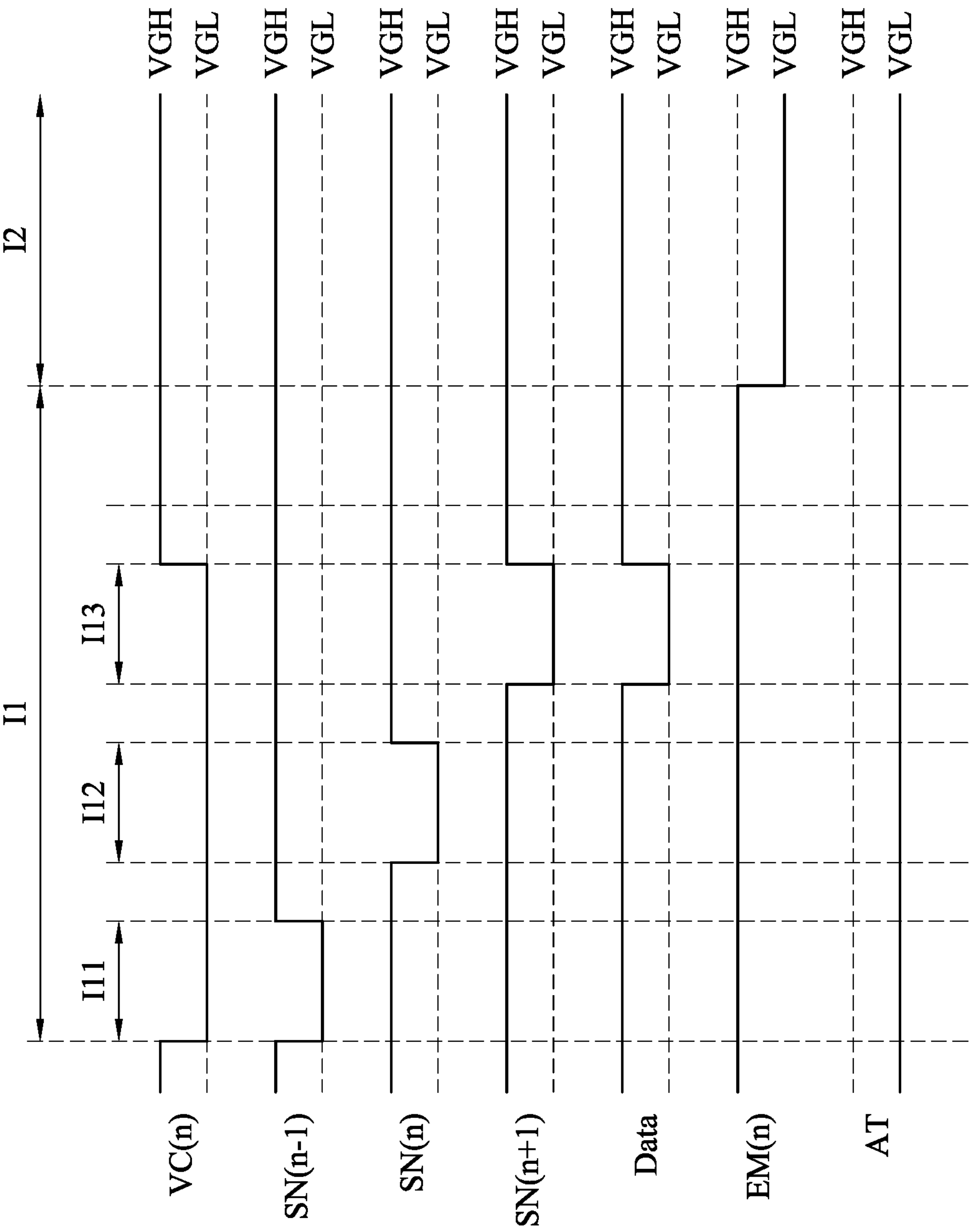
FIG. 2 depicts a signal timing diagram of a pixel detection device according to some embodiments of the present disclosure.

FIG. 2 depicts a signal timing diagram of the pixel detection device 100 shown in FIG. 1 according to some embodiments of the present disclosure. In some embodiments, in order to facilitate the understanding of an operation of the pixel detection device 100 shown in FIG. 1, please refer to FIG. 2 together. The reset circuit 111 is configured to reset the third node N3 and the fourth node N4 to the second reference voltage of the second reference voltage source Vref2 according to the reset signal SN(n−1) in a first sub-stage 111 of a driving stage I1, so as to reset the first node N1 and the second node N2 through the driving transistor DT1.

Then, the compensation circuit 112 is conducted according to the compensation signal SN(n) in a second sub-stage 112 of the driving stage I1, so as to compensate the third node N3.

Furthermore, the writing circuit 113 is conducted according to the writing signal SN(n+1) in a third sub-stage 113 of the driving stage I1, to write the data voltage Data of the data line DL into the third node N3 and the fourth node N4, so as to be stored into the first capacitor C1.

Thereafter, the driving transistor DT1 is configured to generate a driving current according to the data voltage Data of the first capacitor C1 in a detection stage 12, so as to drive the light emitting element LED. At this time, the detection circuit 120 is conducted according to the driving signal EM(n) and the detection control signal AT to detect whether the driving current of the pixel circuit 110 is normal.

It should be noted that when the pixel detection device 100 displays a frame, the detection control signal AT is at a high level VGH. When the pixel detection device 100 is detected, the detection control signal AT is at a low level VGL.

Figure 3:
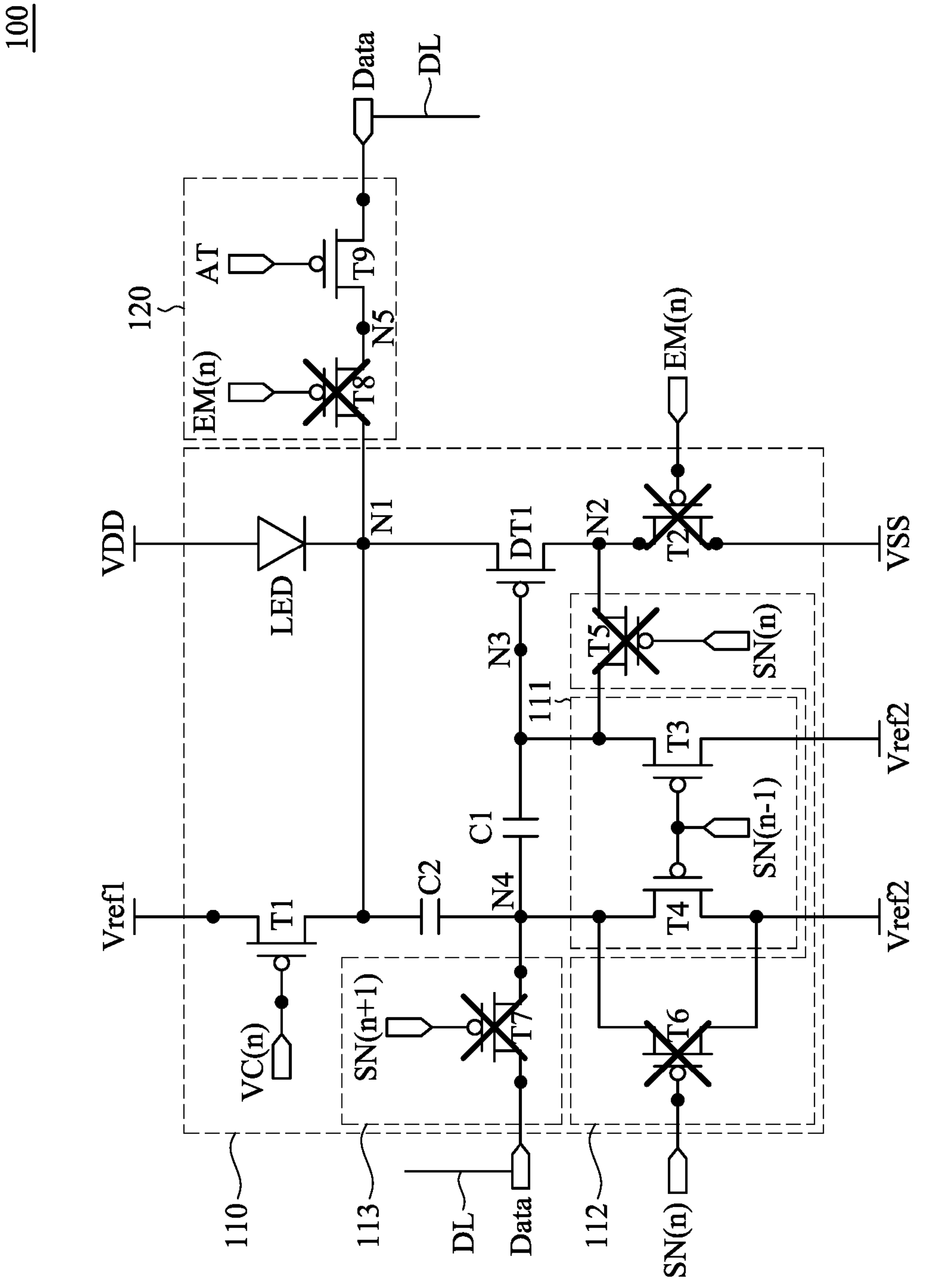
FIG. 3 depicts a state diagram of a pixel detection device according to some embodiments of the present disclosure.

FIG. 3 depicts a state diagram of the pixel detection device 100 according to some embodiments of the present disclosure. In some embodiments, please refer to FIG. 2 and FIG. 3, In the first sub-stage 111 of the driving stage I1, the control signal VC(n) and the reset signal SN(n−1) are at the low level VGL. The compensation signal SN(n) and the writing signal SN(n+1) are at the high level VGH. The reset circuit 111 is configured to reset the third node N3 and the fourth node N4 to the second reference voltage of the second reference voltage source Vref2 according to the reset signal SN(n−1) in the first sub-stage 111 of the driving stage I1, so as to reset the first node N1 and the second node N2 to the first reference voltage of the first reference voltage source Vref1 through the driving transistor DT1.

Figure 4:
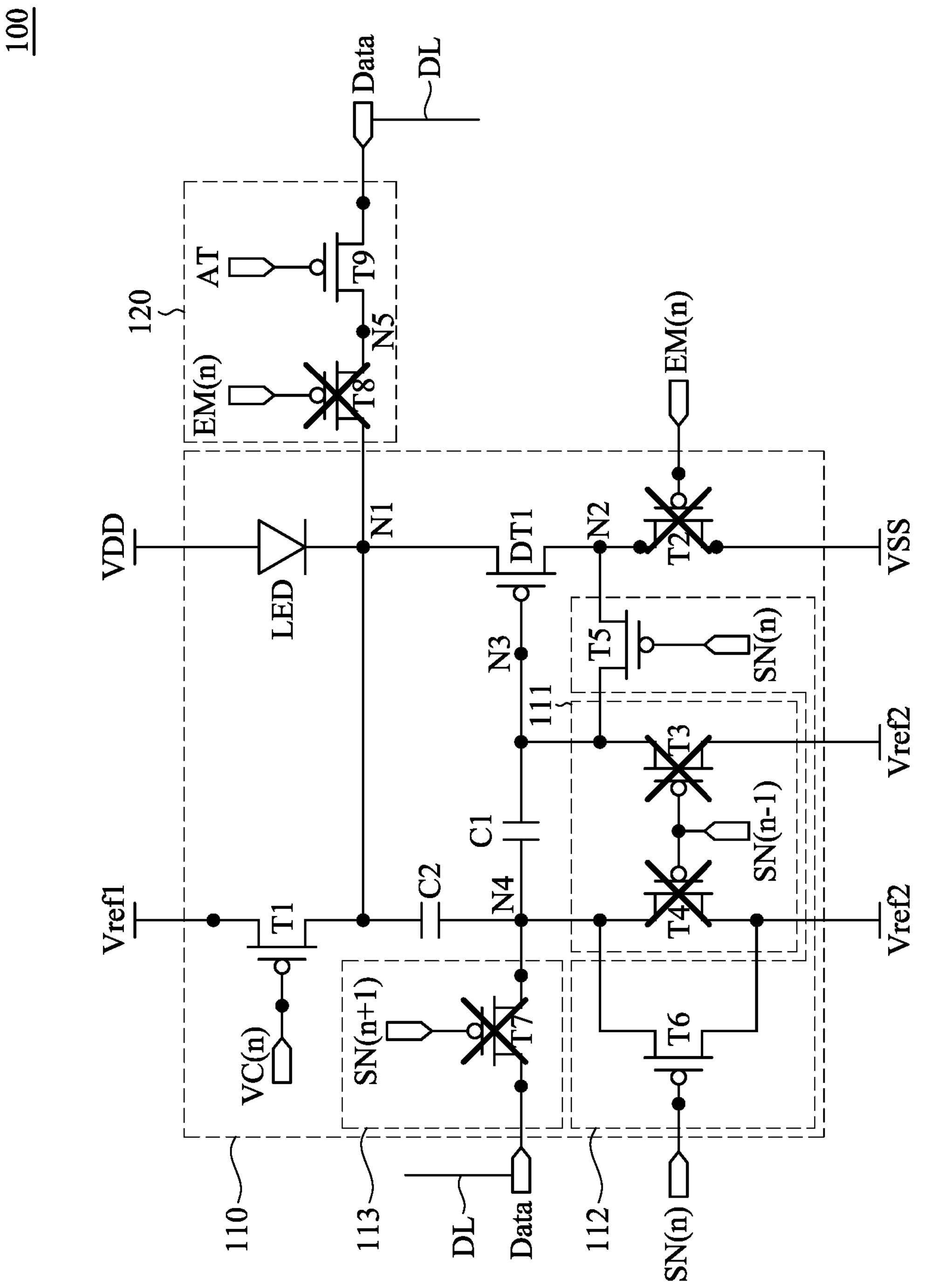
FIG. 4 depicts a state diagram of a pixel detection device according to some embodiments of the present disclosure.

FIG. 4 depicts a state diagram of the pixel detection device 100 according to some embodiments of the present disclosure. In some embodiments, please refer to FIG. 2 and FIG. 4, in the second sub-stage 112 of the driving stage I1, the control signal VC(n) and the compensation signal SN(n) are at the low level VGL. The reset signal SN(n−1) and the writing signal SN(n+1) are at the high level VGH. The compensation circuit 112 is conducted to compensate the third node N3 according to the compensation signal SN(n) in the second sub-stage 112 of the driving stage I1.

In some embodiments, since the driving transistor DT1 is conducted according to the second reference voltage of the third node N3, the first reference voltage of the first reference voltage source Vref1 compensates the first reference voltage of the first reference voltage source Vref1 for the third node N3 through the first transistor T1 and the driving transistor DT1.

In some embodiments, a voltage value of the first reference voltage of the first reference voltage source Vref1 is greater than or equal to the system high voltage of the system high voltage source VDD.

Figure 5:
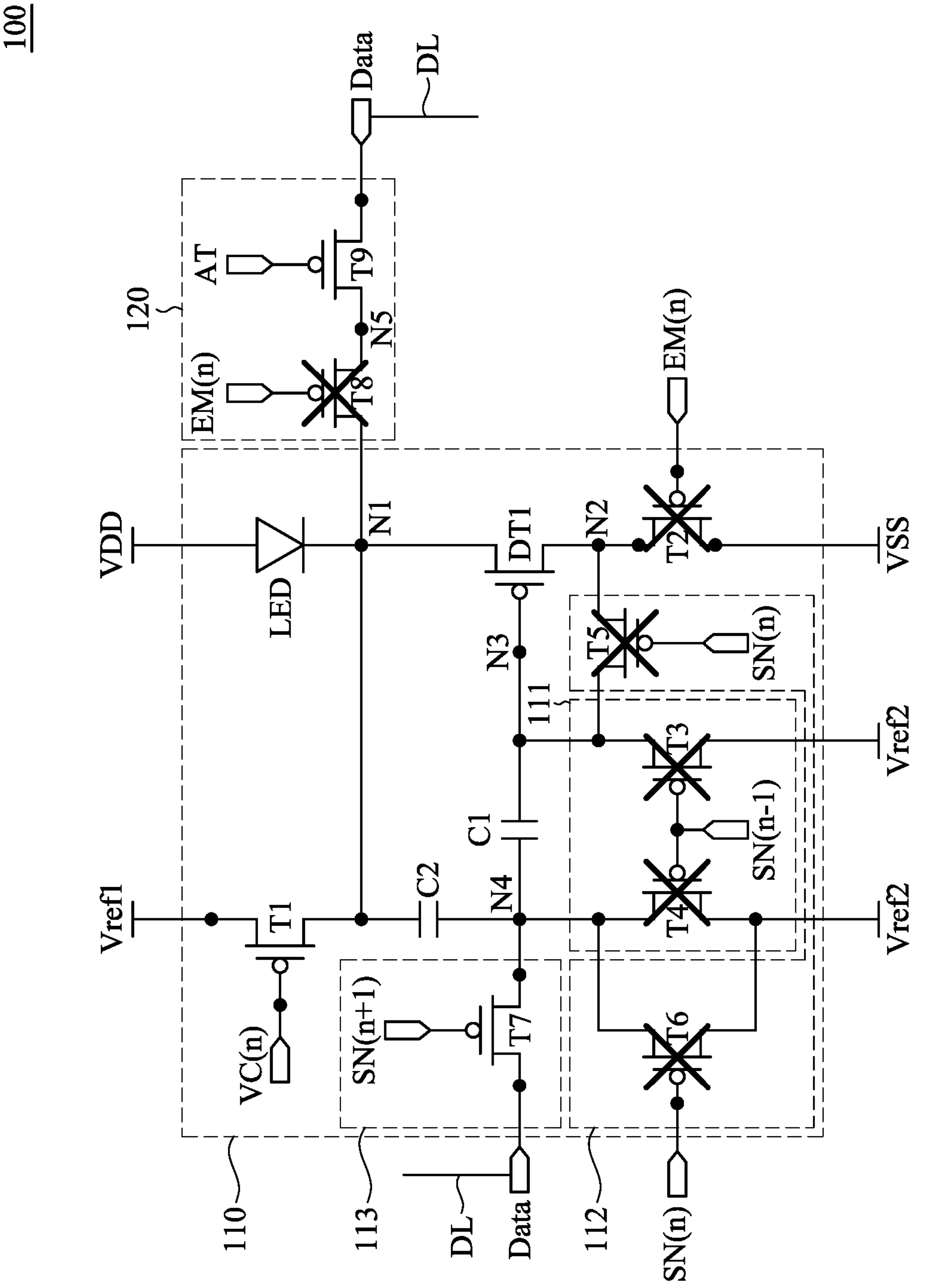
FIG. 5 depicts a state diagram of a pixel detection device according to some embodiments of the present disclosure.

FIG. 5 depicts a state diagram of the pixel detection device 100 according to some embodiments of the present disclosure. In some embodiments, please refer to FIG. 2 and FIG. 5, in the third sub-stage 113 of the driving stage I1, the control signal VC(n) and the writing signal SN(n+1) are at the low level VGL. The reset signal SN(n−1) and the compensation signal SN(n) are at the high level VGH. The writing circuit 113 is conducted according to the writing signal SN(n+1) in the third sub-stage 113 of the driving stage I1, so to write the data voltage Data of the data line DL into the third nod N3 and the fourth node N4 to be stored into the first capacitor C1.

In some embodiments, the data voltage Data is a grayscale voltage for controlling grayscales of a frame. In some embodiments, a range of grayscales of the frame is from 0-th level to 255-th level. There are 256 kinds of grayscale voltages.

Figure 6:
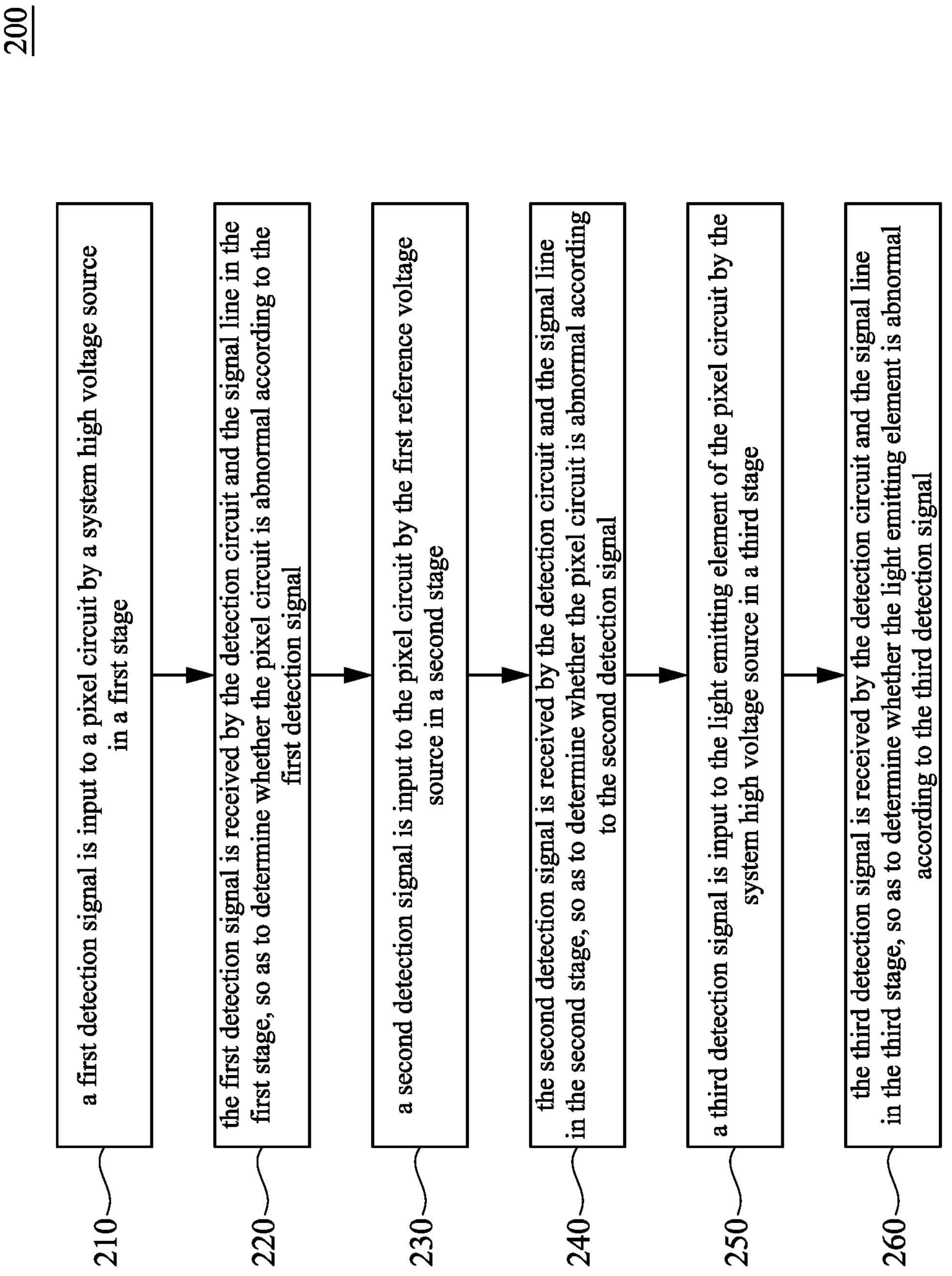
FIG. 6 depicts a schematic flow chart of a pixel detection method according to some embodiments of the present disclosure.
Figure 7:
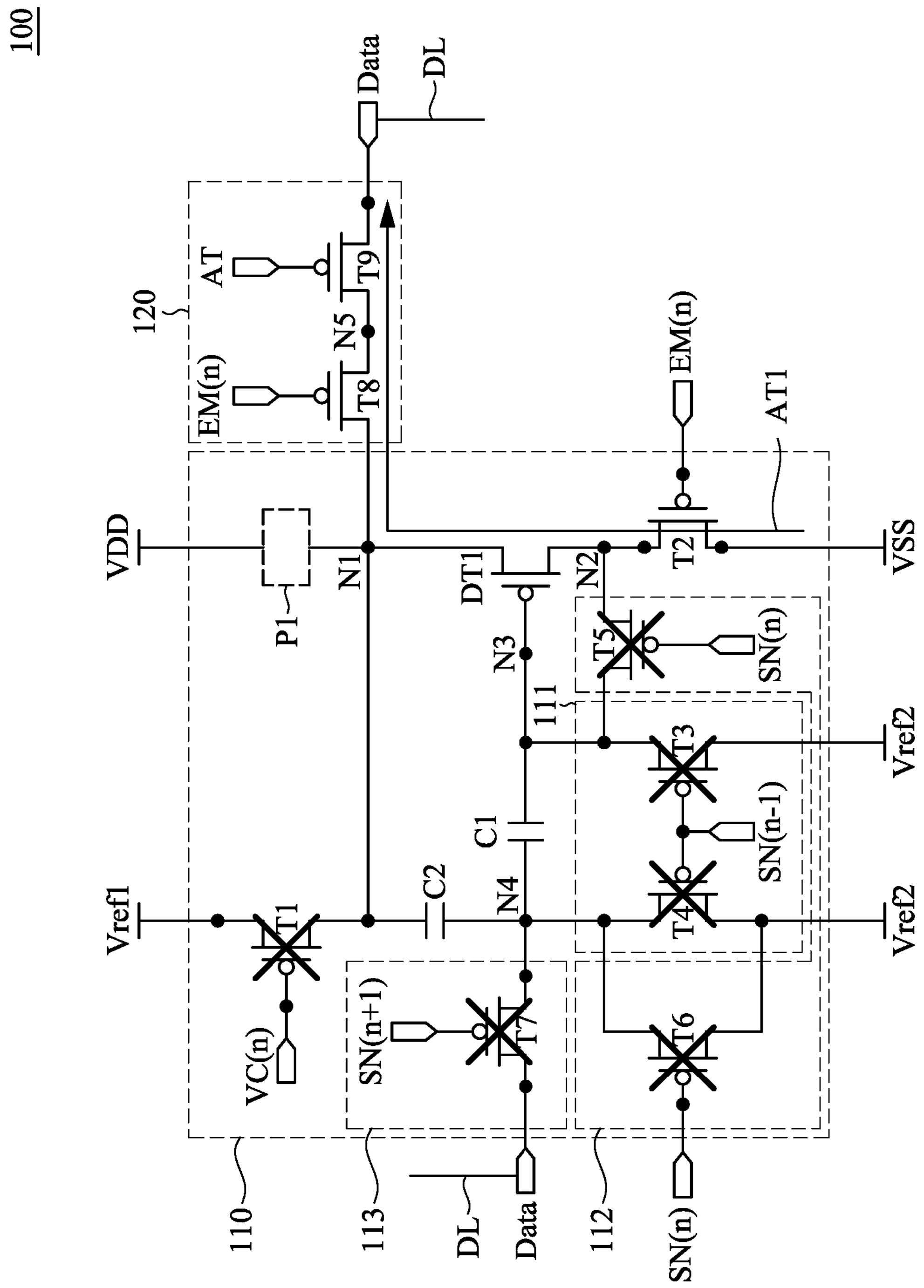
FIG. 7 depicts a state diagram of a pixel detection device according to some embodiments of the present disclosure.
Figure 8:
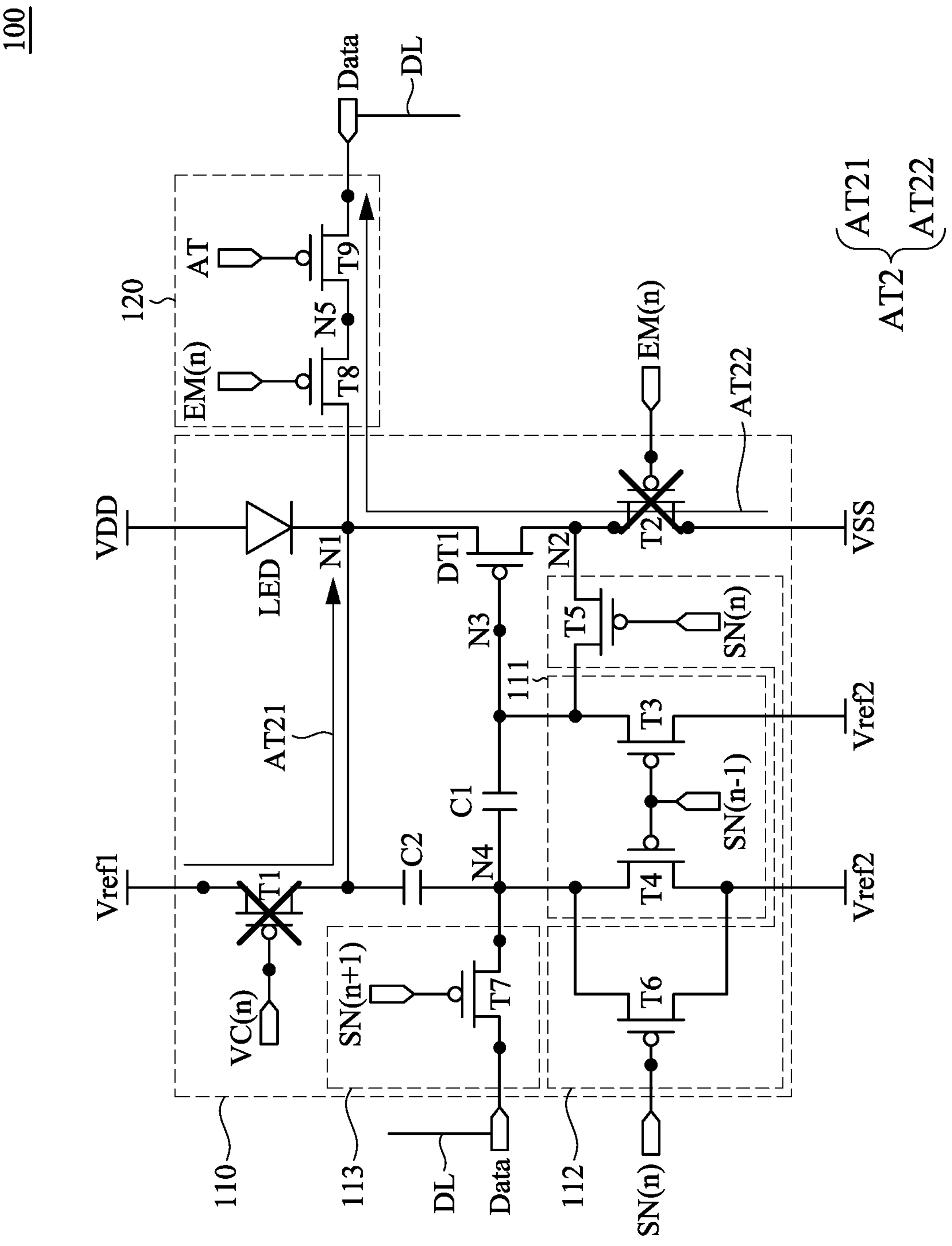
FIG. 8 depicts a state diagram of a pixel detection device according to some embodiments of the present disclosure.
Figure 9:
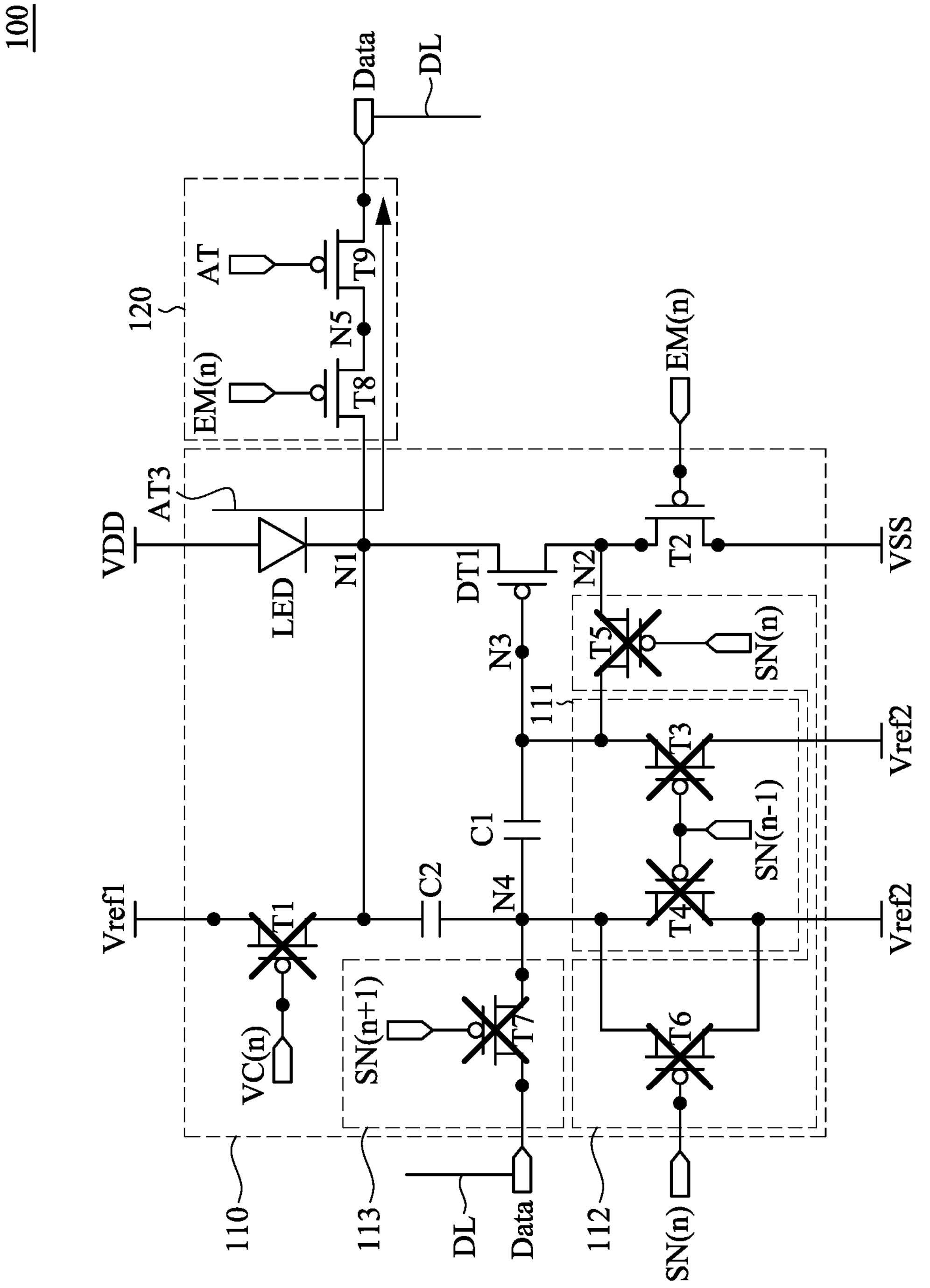
FIG. 9 depicts a state diagram of a pixel detection device according to some embodiments of the present disclosure.

FIG. 6 depicts a schematic flow chart of a pixel detection method 200 according to some embodiments of the present disclosure. In some embodiments, the pixel detection method 200 can be executed by the pixel detection device 100 shown in FIG. 1. In order to facilitate the understanding of an operation of the pixel detection method 200 of FIG. 6, please refer to FIG. 7 to FIG. 9. FIG. 7 to FIG. 9 depict state diagrams of the pixel detection device according to some embodiments of the present disclosure, corresponding to the pixel detection device 100 in FIG. 1.

In step 210, a first detection signal is input to a pixel circuit by a system high voltage source in a first stage.

In some embodiments, please refer to FIG. 2, FIG. 6 and FIG. 7, compared with the pixel detection device in FIG. 1, the pixel detection device in FIG. 7 is a state diagram before a mass transfer technology stage. In short, the pixel detection device 100 in FIG. 7 has not yet been installed the light-emitting element LED (i.e. a position P1). In the detection stage 12 before the mass transfer technology stage, the driving signal EM(n) and the detection control signal AT are at the low level VGL. The detection circuit 120 forms a first detection loop AT1 with the system low voltage source VSS and a signal line (e.g. the data line DL). In this stage, the first detection signal is input to the pixel circuit 110 through the system low voltage source VSS.

It should be noted that the mass transfer technology is that after a epitaxy process of the light-emitting element LED, a film transfer process of the light-emitting element LED must be carried out, to transfer millions of micron-scale light-emitting elements LEDs to each pixel (i.e., the pixel detection device 100) in a pixel array in the display panel. In some embodiments, the light emitting element LED includes a Micro light-emitting diode(μ-LED).

It is further illustrated that the embodiment in FIG. 2 is a timing diagram of detection signals before the mass transfer technology stage, after the mass transfer technology stage, and before the pixel detection device 100 in FIG. 1 leaves a factory.

In step 220, the first detection signal is received by the detection circuit and the signal line in the first stage, so as to determine whether the pixel circuit is abnormal according to the first detection signal.

In some embodiments, please refer to FIG. 2, FIG. 6 and FIG. 7, in the detection stage 12 before the mass transfer technology stage, the driving signal EM(n) and the detection control signal AT are at the low level VGL. The detection circuit 120 and the signal line (e.g.: the data line DL) receive the first detection signal of the first detection loop AT1, so as to determine whether the pixel circuit 110 is abnormal.

In some embodiments, a processor of the pixel detection device 100 (not shown in the figure) is configured to determine whether a current range of the first detection signal is in a preset range, so as to determine whether the pixel circuit 110 is abnormal.

In some embodiments, the data line DL is configured to locate the pixel detection device 100(i.e. a pixel) in a horizontal direction. A signal line transmitting the driving signal EM(n) is configured to locate the pixel detection device 100 in a vertical direction.

In step 230, a second detection signal is input to the pixel circuit by the first reference voltage source in a second stage.

In some embodiments, please refer to FIG. 2, FIG. 6 and FIG. 8, The detection circuit 120 forms a second detection loop AT2 with the first reference voltage source Vref1, the system low voltage source VSS, the pixel circuit 110 and the signal line (e.g.: the data line DL). The second detection loop AT2 includes a first detection sub-loop AT21 and a second detection sub-loop AT22.

In the driving stage I1 after the mass transfer technology stage, the control signal VC(n) and the detection control signal AT are at the low level VGL. The driving signal is at the high level VGH. The second detection signal is input to the first node N1 of the pixel circuit 110 by the first reference voltage source Vref1 along the first detection sub-loop AT21.

In step 240, the second detection signal is received by the detection circuit and the signal line in the second stage, so as to determine whether the pixel circuit is abnormal according to the second detection signal.

In some embodiments, please refer to FIG. 2, FIG. 6 and FIG. 8, following the above step 230, in the detection stage 12 after the mass transfer technology stage, the driving signal EM(n) and the detection control signal AT are at the low level VGL. The control signal VC(n) are at the high level VGH. By controlling a voltage of the system low voltage source VSS, the second detection signal of the node of the pixel circuit 110 in the driving stage I1 is guided to the detection circuit 120 and the signal line (e.g.: the data line DL) along the second detection sub-loop AT22. The second detection signal is received by the detection circuit 120 and the signal line (e.g.: the data line DL), so as to determine whether the pixel circuit 110 is abnormal according to the second detection signal.

In some embodiments, a processor of the pixel detection device 100 (not shown in the figure) is configured to determine whether a current range of the second detection signal is in a preset range, so as to determine whether the pixel circuit 110 is abnormal.

In step 250, a third detection signal is input to the light emitting element of the pixel circuit by the system high voltage source in a third stage.

In some embodiments, please refer to FIG. 2, FIG. 6 and FIG. 9, in the detection stage 12 before and after the mass transfer technology stage, the detection circuit 120 forms a third detection loop AT3 with the system high voltage source VDD, the light emitting element LED and the signal line (e.g.: the data line DL). The third detection signal is input to the light emitting element LED of the pixel circuit 110 through the system high voltage source VDD.

In step 260, the third detection signal is received by the detection circuit and the signal line in the third stage, so as to determine whether the light emitting element is abnormal according to the third detection signal.

In some embodiments, please refer to FIG. 2, FIG. 6 and FIG. 9, in the detection stage 12 before and after the mass transfer technology stage, the driving signal EM(n) and the detection control signal AT are at the low level VGL. The detection circuit 120 and the signal line(e.g.: the data line DL) is configured to receive the third detection signal of the third detection loop AT3, so as to determine the light emitting element LED is abnormal according to the third detection signal.

In some embodiments, a processor of the pixel detection device 100 (not shown in the figure) is configured to determine whether a current range of the third detection signal is in a preset range, so as to determine whether light emitting element LED of the pixel circuit 110 is abnormal.

It should be noted that whether the light emitting element LED is abnormal will be detected before and after the mass transfer technology stage.

In some embodiments, the aforementioned driving transistor DT1 and transistor T1 to transistor T9 are P-type Metal-Oxide-Semiconductor Field-Effect Transistor (PMOS).

In some embodiments, the aforementioned driving transistor DT1 and transistor T1 to transistor T9 are N-type Metal-Oxide-Semiconductor Field-Effect Transistor (NMOS).

Figure 10:
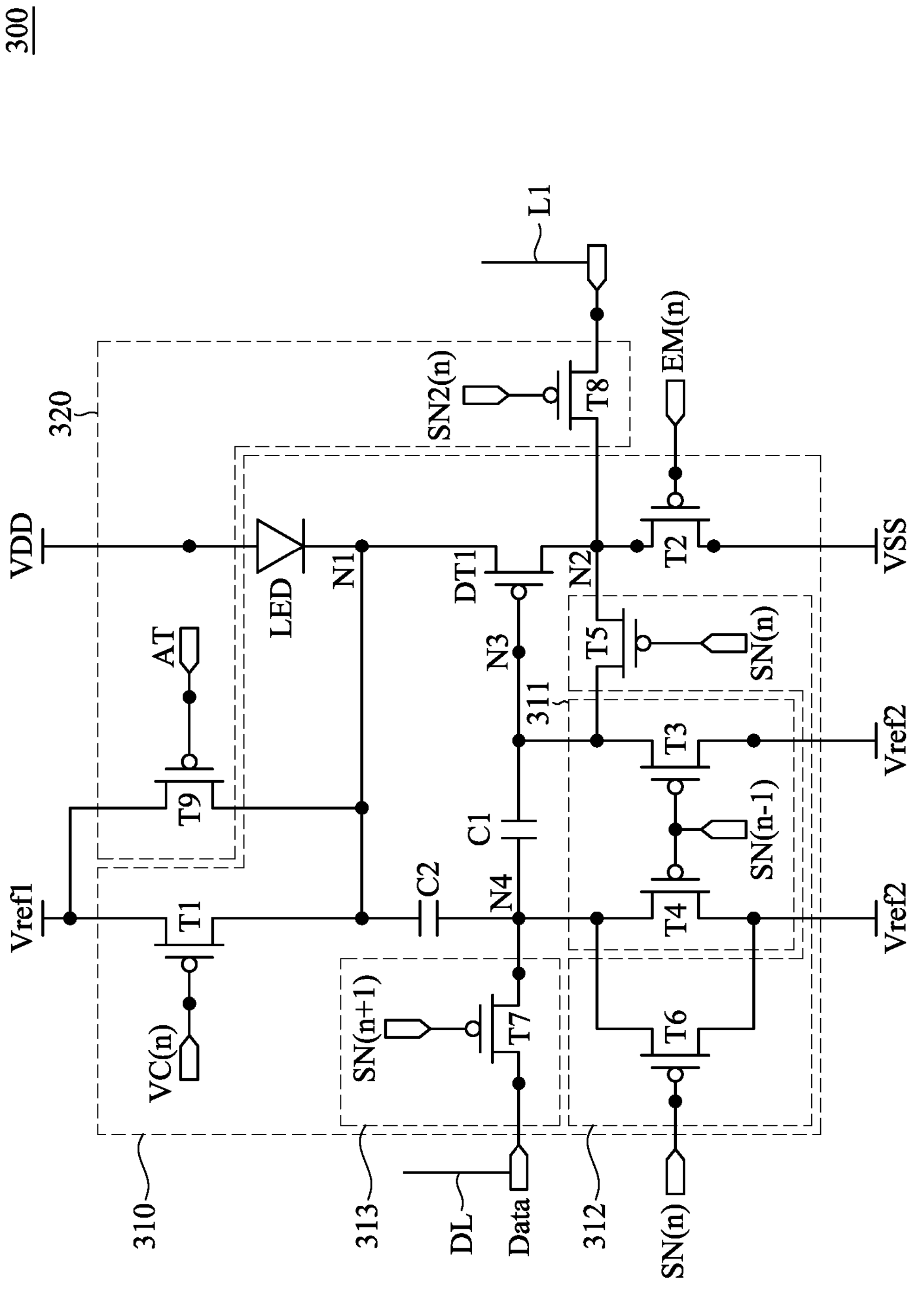
FIG. 10 depicts a schematic diagram of a pixel detection device according to some embodiments of the present disclosure.

FIG. 10 depicts a schematic diagram of a pixel detection device 300 according to some embodiments of the present disclosure. In some embodiments, as shown in FIG. 10, the pixel detection device 300 includes a signal line L1, a pixel circuit 310 and a detection circuit 320. The pixel circuit 310 is coupled to a system high voltage source VDD, a system low voltage source VSS, a first reference voltage source Vref1 and a second reference voltage source Vref2. The detection circuit 320 is coupled to the signal line L1, the pixel circuit 310 and the first reference voltage source Vref1.

In some embodiments, the detection circuit 320 is configured to receive a first driving signal SN2(n) and a detection control signal AT. The detection circuit 320 forms a first detection loop (not shown in the figure) with the first reference voltage source Vref1, the pixel circuit 310 and the signal line L1, so as to determine whether the pixel circuit 310 is abnormal according to the first driving signal SN2(n) and the detection control signal AT in a first stage.

Then, the detection circuit 320 forms a second detection loop(not shown in the figure) with the system low voltage source VSS, the pixel circuit 310 and the signal line L1, so as to detect whether the pixel circuit 310 is abnormal according to the first driving signal SN2(n) and the detection control signal AT in a second stage.

Furthermore, the detection circuit 320 forms a third detection loop(not shown in the figure) with the system high voltage source VDD, the light emitting element LED and the signal line L1, so as to determine whether the light emitting element LED is abnormal according to the first driving signal SN2(n) and the detection control signal AT in a third stage.

It should be noted that, compared with embodiment in FIG. 1, a first difference between the embodiment in FIG. 10 and the embodiment in FIG. 1 is that the first detection transistor T8 of the detection circuit 320 is coupled to the second node N2 of the pixel circuit 310 and the second detection transistor T9 of the detection circuit 320 is coupled to the first reference voltage source Vref1.

Then, a second difference between the embodiment in FIG. 10 and the embodiment in FIG. 1 is that the control terminal of the first detection transistor T8 of the detection circuit 320 is configured to receive the first driving signal SN2(n). A third difference between the embodiment in FIG. 10 and the embodiment in FIG. 1 is that the first detection transistor T8 of the detection circuit 320 is coupled to the signal line L1. The rest structures and operations are the same as those of the pixel detection device 100 in FIG. 1, and repetitious details are omitted herein.

In some embodiments, the pixel circuit 310 includes a reset circuit 311, a compensation circuit 312 and a writing circuit 313. The rest structures and operations are the same as those of the pixel detection device 100 in FIG. 1, and repetitious details are omitted herein.

It is further illustrated that, please refer to FIG. 10, the signal line L1 is different from the data line DL. During detection, the signal line L1 is configured to receive the detection signal and transmit the detection signal to a processor or a driving integrated circuit of the pixel detection device 100 (not shown in the figure).

In some embodiments, the signal line L1 is configured to locate the pixel detection device 300(i.e. a pixel) in a horizontal direction. A signal line transmitting the first driving signal SN2(n) is configured to locate the pixel detection device 300 in a vertical direction.

In some embodiments, the signal line L1 can be the data line DL. During detection, the data line DL1 is configured to receive the detection signal and transmit the detection signal to a processor or a driving integrated circuit of the pixel detection device 300 (not shown in the figure). During display, the data line DL1 is configured to input the data voltage Data from a left side the pixel detection device 300.

Figure 11:
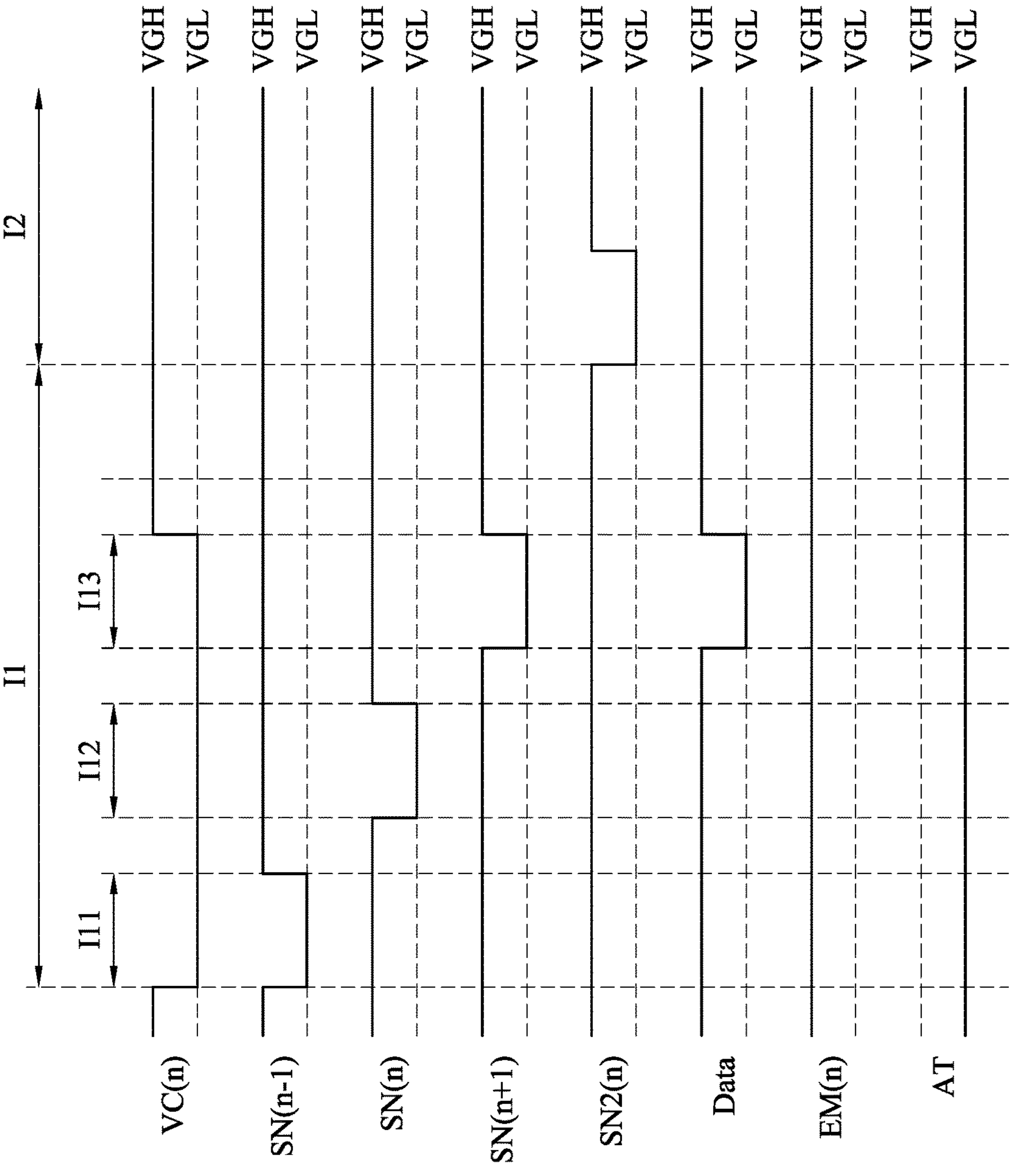
FIG. 11 depicts a signal timing diagram of a pixel detection device according to some embodiments of the present disclosure.

FIG. 11 depicts a signal timing diagram of the pixel detection device 300 according to some embodiments of the present disclosure. Compared with the embodiment in FIG. 2, a first difference between the embodiment in FIG. 11 and embodiment in FIG. 2 is an addition of the first drive signal SN2(n). A second difference between the embodiment in FIG. 11 and embodiment in FIG. 2 is that the driving signal EM(n) is at the high level VGH in the second stage 12.

Figure 12:
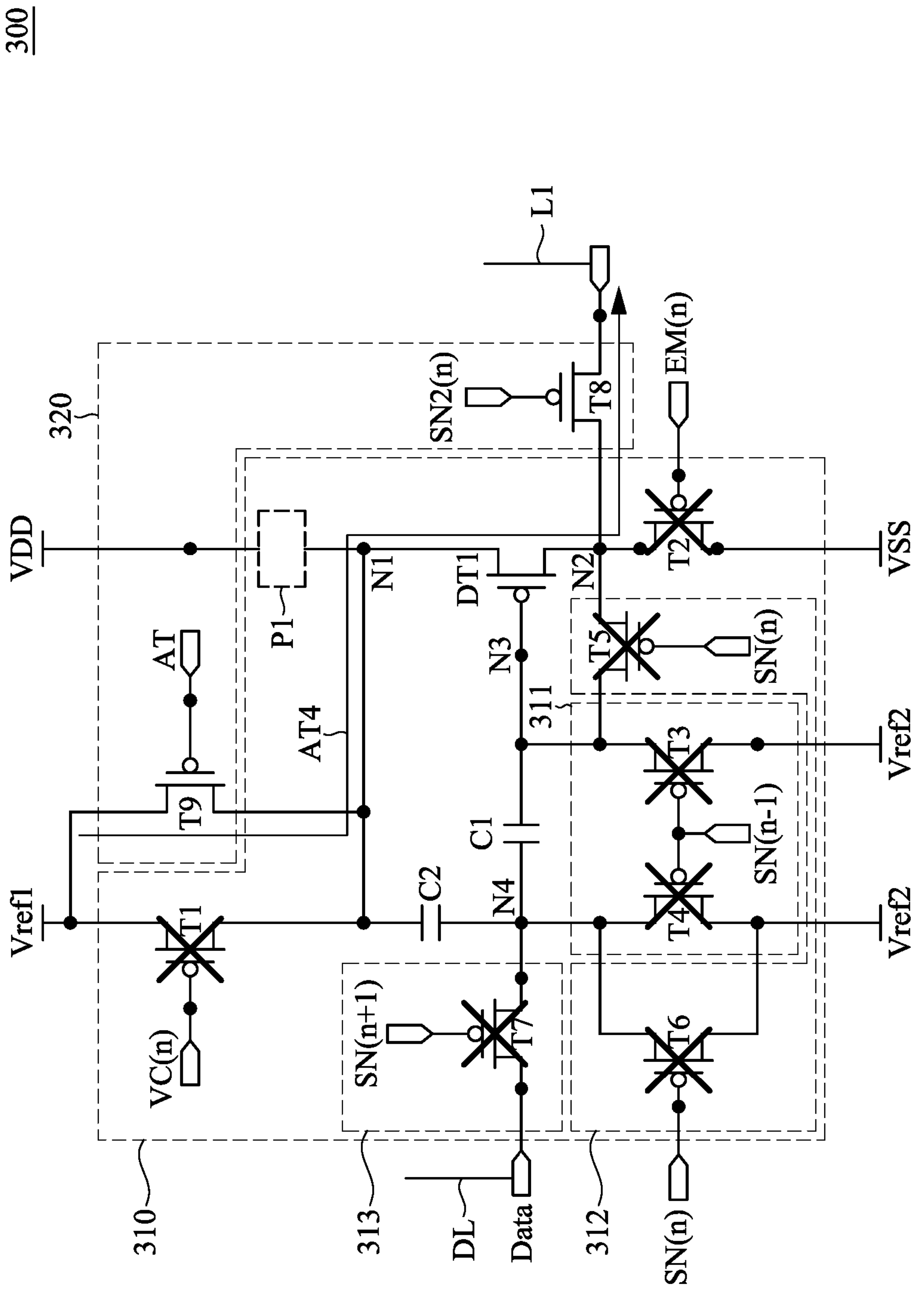
FIG. 12 depicts a state diagram of a pixel detection device according to some embodiments of the present disclosure.

FIG. 12 depicts a state diagram of the pixel detection device 300 according to some embodiments of the present disclosure. In some embodiments, please refer to FIG. 11 and FIG. 12, before the detection stage 12, the pixel detection device 300 will execute the driving stage I1, and the detailed implementation method is the same as that of the pixel detection device 100 in FIG. 3 to FIG. 5, and repetitious details are omitted herein. The embodiment in FIG. 12 is a state diagram of the pixel detection device 300 before and after the mass transfer technology (i.e., the light-emitting element LED in FIG. 10 is not installed at the position P1).

In some embodiments, in the detection stage 12 before and after the mass transfer technology stage, the detection control signal AT is at the low level VGL. The driving signal EM(n) is at the high level VGH. The first driving signal SN2(n) is at the low level VGL, and at other times is at the high level VGH. The signal line L1 is configured to receive a first detection signal of a detection loop AT4, so as to determine whether the pixel circuit 310 is abnormal according to the first driving signal SN2(n) and the detection control signal AT in the detection stage 12 before and after the mass transfer technology stage.

Figure 13:
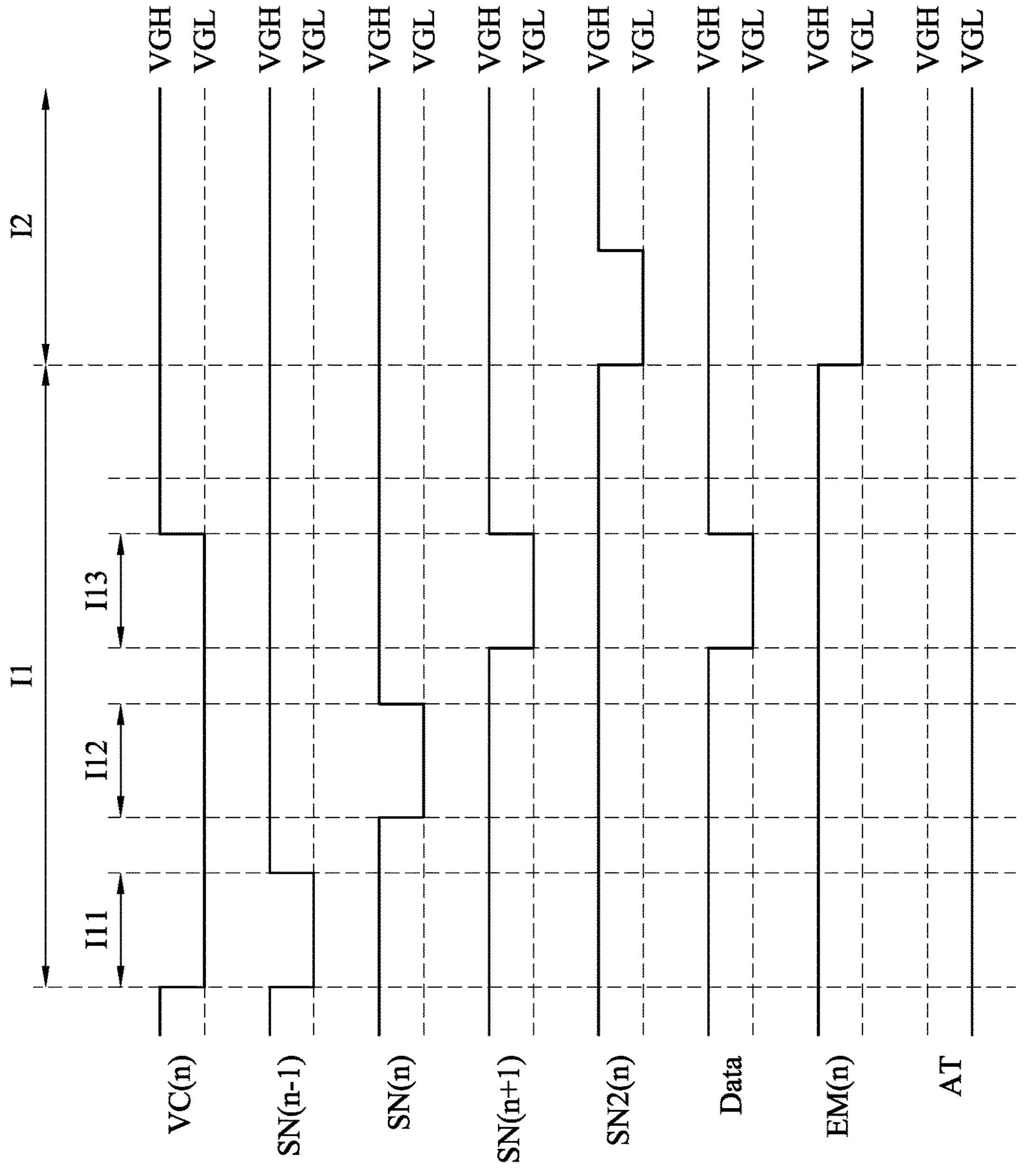
FIG. 13 depicts a signal timing diagram of a pixel detection device according to some embodiments of the present disclosure.

FIG. 13 depicts a signal timing diagram of the pixel detection device 300 according to some embodiments of the present disclosure. Compared with the embodiment in FIG. 11, a difference between the embodiment in FIG. 13 and the embodiment in FIG. 11 is that the driving signal EM(n) is at the low level VGL in the detection stage 12 and the detection control signal AT is at the high level VGH.

Figure 14:
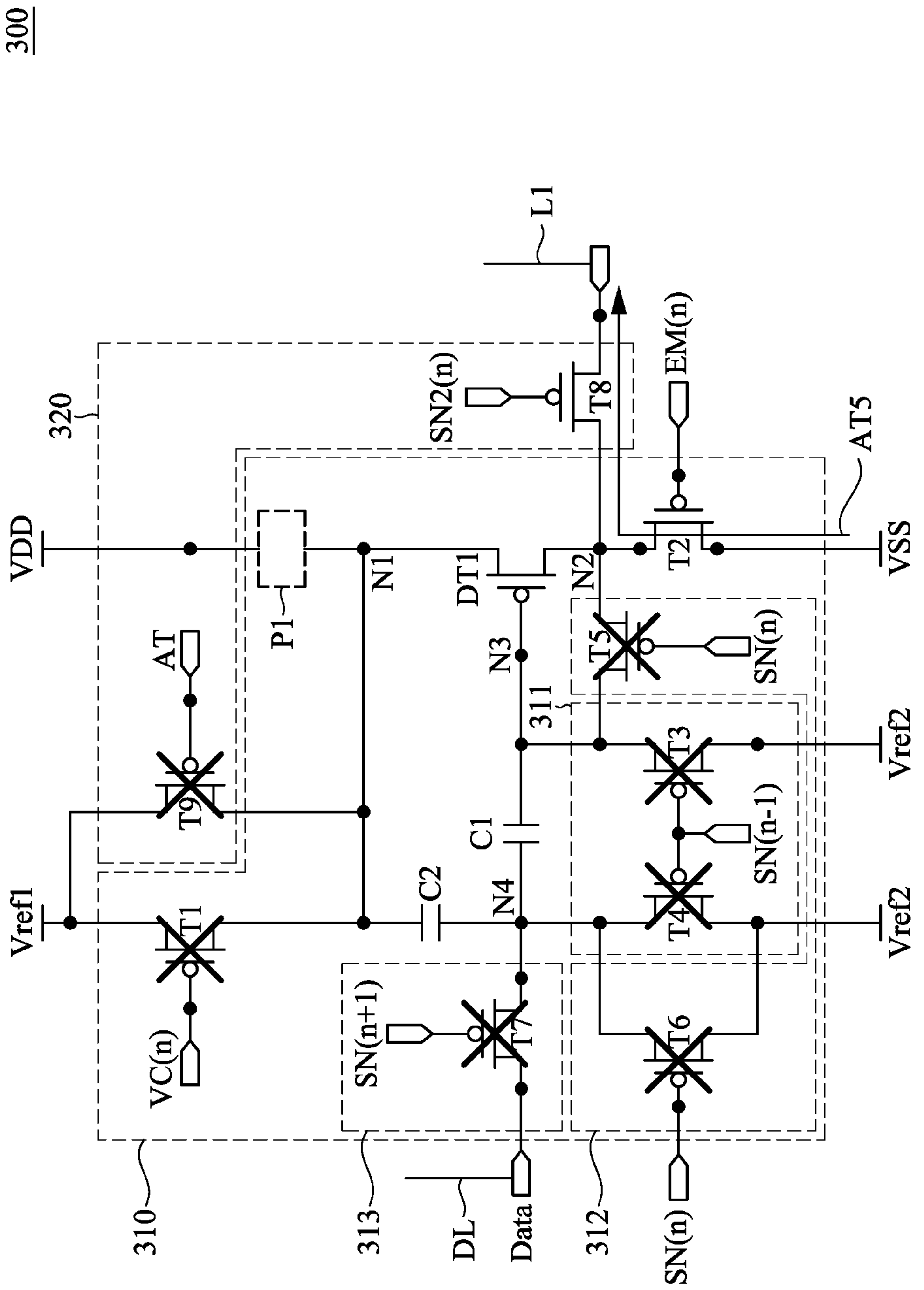
FIG. 14 depicts a state diagram of a pixel detection device according to some embodiments of the present disclosure.

FIG. 14 depicts a state diagram of the pixel detection device 300 according to some embodiments of the present disclosure. In some embodiments, please refer to FIG. 13 and FIG. 14, before the detection stage 12, the pixel detection device 300 will execute the driving stage I1, and the detailed implementation method is the same as that of the pixel detection device 100 in FIG. 3 to FIG. 5, and repetitious details are omitted herein. The embodiment in FIG. 14 is a state diagram of the pixel detection device 300 before and after the mass transfer technology (i.e., the light-emitting element LED in FIG. 10 is not installed at the position P1).

In some embodiments, in the detection stage 12 before and after the mass transfer technology stage, the driving signal EM(n) is at the low level VGL. The detection control signal AT is at the high level VGH. The first driving signal SN2(n) is at the low level VGL, and at other times is at the high level VGH. The signal line L1 is configured to receive a second detection signal of a detection loop AT5, so as to determine whether the pixel circuit 310 is abnormal according to the first driving signal SN2(n) and the driving signal EM(n) in the detection stage 12 before and after the mass transfer technology stage.

Figure 15:
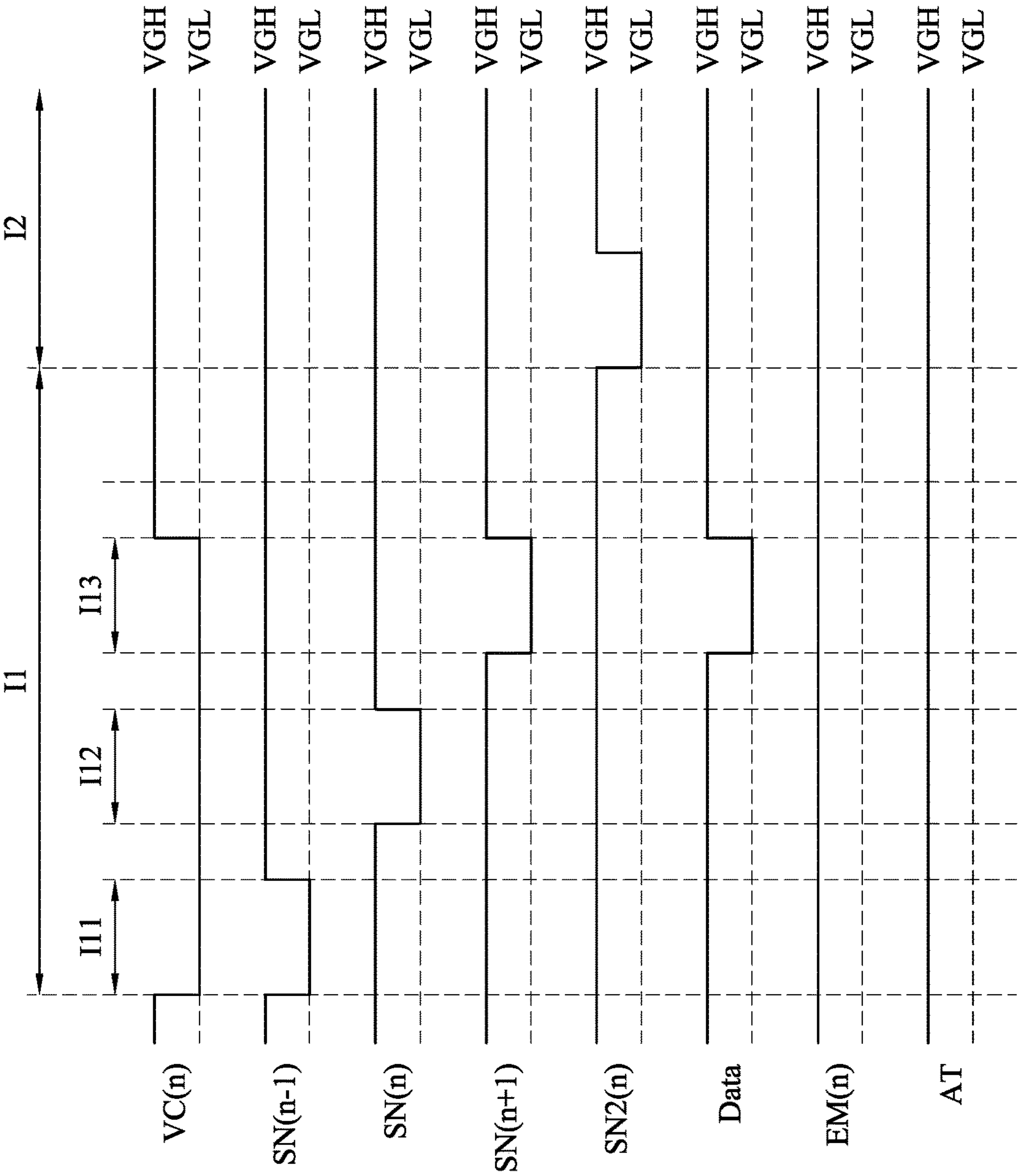
FIG. 15 depicts a signal timing diagram of a pixel detection device according to some embodiments of the present disclosure.

FIG. 15 depicts a signal timing diagram of the pixel detection device 300 according to some embodiments of the present disclosure. Compared with the embodiment in FIG. 11, a difference between the embodiment in FIG. 13 and the embodiment in FIG. 11 is that the driving signal EM(n) and the detection control signal AT are at the high level VGH in the detection stage 12.

Figure 16:
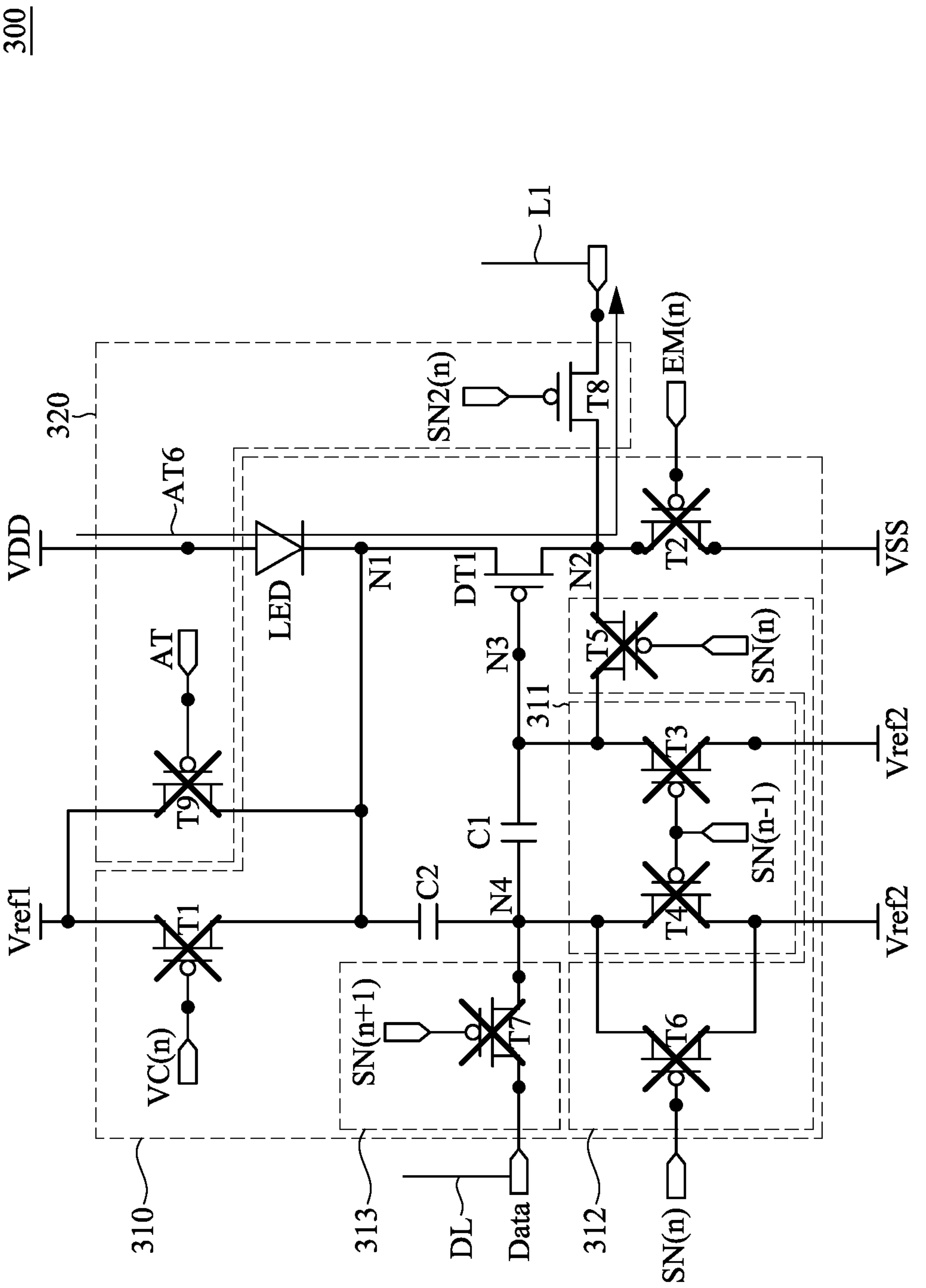
FIG. 16 depicts a state diagram of a pixel detection device according to some embodiments of the present disclosure.

FIG. 16 depicts a state diagram of the pixel detection device 300 according to some embodiments of the present disclosure. In some embodiments, please refer to FIG. 15 and FIG. 16, before the detection stage 12, the pixel detection device 300 will execute the driving stage I1, and the detailed implementation method is the same as that of the pixel detection device 100 in FIG. 3 to FIG. 5, and repetitious details are omitted herein. The embodiment in FIG. 16 is a state diagram of the pixel detection device 300 before and after the mass transfer technology (i.e., the light-emitting element LED is installed).

In some embodiments, in the detection stage 12 before and after the mass transfer technology stage, the driving signal EM(n) and the detection control signal AT are at the high level VGH. The first driving signal SN2(n) is at the low level VGL, and at other times is at the high level VGH. The signal line L1 is configured to receive a second detection signal of a detection loop AT6, so as to determine the light emitting element LED of the pixel circuit 310 is abnormal according to the first driving signal SN2(n) in the detection stage 12 before and after the mass transfer technology stage. It should be note that the detection loop AT6 is further configured to detect an external compensation voltage.

In some embodiments, the pixel detection device 100 is applied in spliced displays and vehicle displays, and has a function of detecting pixels. In some embodiments, the pixel detection device 300 is applied in spliced displays and vehicle displays, and has a function of detecting pixels and externally compensating pixels.

Based on the above embodiments, the present disclosure provides a pixel detection device and a pixel detection method, so that a circuit design of a pixel detection device enables a pixel can detect a pixel circuit, a light-emitting element or perform external compensation during a manufacturing process, and reduces a power consumption when a pixel detection device displays by reducing components between a system high voltage source and a system low voltage source.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A pixel detection device, comprising:

a data line;

a pixel circuit, coupled to a system high voltage source, a system low voltage source and a first reference voltage source; and a detection circuit, coupled to the data line and the pixel circuit, and configured to receive a driving signal and a detection control signal, wherein the detection circuit forms a first detection loop with the system low voltage source and the data line, so as to detect whether the pixel circuit is abnormal according to the driving signal and the detection control signal in a first stage, wherein the detection circuit forms a second detection loop with the first reference voltage source, the system low voltage source, the pixel circuit, and the data line, so as to detect whether the pixel circuit is abnormal according to the driving signal and the detection control signal in a second stage.

2. The pixel detection device of claim 1, wherein the pixel circuit comprises:

a first node;

a second node;

a third node;

a fourth node; and a light emitting element, configured to emit light according to a driving current of the pixel circuit, wherein the light emitting element comprises:

a first terminal, coupled to the system high voltage source; and a second terminal, coupled to the first node.

3. The pixel detection device of claim 2, wherein the detection circuit forms a third detection loop with the system high voltage source, the light emitting element and the data line, so as to detect whether the light emitting element is abnormal according to the driving signal and the detection control signal in a third stage.

4. The pixel detection device of claim 2, wherein the pixel circuit further comprises:
a driving transistor, comprising:
a first terminal, coupled to the first node;
a second terminal, coupled to the second node; and
a control terminal, coupled to the third node, and configured to drive the light emitting element according to a voltage level of the third node, wherein the first node, the second node and the third node are not a same point;
a first transistor, comprising:
a first terminal, coupled to the first reference voltage source, and configured to receive a first reference voltage of the first reference voltage source;
a second terminal, coupled to the first node; and
a control terminal, configured to receive a control signal, wherein the first transistor is conducted in response to the control signal; and
a second transistor, comprising:
a first terminal, coupled to the driving transistor;
a second terminal, coupled to the system low voltage source; and
a control terminal, configured to receive the driving signal, wherein the second transistor is conducted in response to the driving signal.

5. The pixel detection device of claim 4, wherein the pixel circuit further comprises:
a reset circuit, coupled to the third node, the fourth node and a second reference voltage source, and configured to reset the third node to a second reference voltage of the second reference voltage source, so as to reset the first node and the second node through the driving transistor, wherein the reset circuit comprises:
a third transistor, comprising:
a first terminal, coupled to the third node;
a second terminal, coupled to the second reference voltage source; and
a control terminal, configured to receive a reset signal, wherein the third transistor is configured to reset the third node in response to the reset signal; and
a fourth transistor, comprising:
a first terminal, coupled to the fourth node;
a second terminal, coupled to the second reference voltage source; and
a control terminal, configured to receive the reset signal, wherein the fourth transistor is conducted in response to the reset signal.

6. The pixel detection device of claim 5, wherein the pixel circuit further comprises:
a compensation circuit, coupled to the second node, the third node, the fourth node and the reset circuit, and configured to compensate the third node to the first reference voltage of the first reference voltage source, wherein the compensation circuit comprises:
a fifth transistor, comprising:
a first terminal, coupled to the second node;
a second terminal, coupled to the third node; and
a control terminal, configured to receive a compensation signal, wherein the fifth transistor is conducted in response to the compensation signal; and
a sixth transistor, comprising:
a first terminal, coupled to the fourth node;
a second terminal, coupled to the second reference voltage source;
a control terminal, configured to receive the compensation signal, wherein the sixth transistor is conducted in response to the compensation signal.

7. The pixel detection device of claim 6, wherein the pixel circuit further comprises:
a writing circuit, coupled to the fourth node and the data line, and configured to receive a data voltage of the data line for writing into the third node and the fourth node, wherein the writing circuit comprises:
a seventh transistor, comprising:
a first terminal, coupled to the fourth node;
a second terminal, coupled to the data line; and
a control terminal, configured to receive a writing signal, wherein the seventh transistor is conducted in response to the writing signal.

8. The pixel detection device of claim 2, wherein the detection circuit comprises:
a fifth node;
a first detection transistor, comprising:
a first terminal, coupled to the fifth node;
a second terminal, coupled to the first node of the pixel circuit; and
a control terminal, configured to receive the driving signal, wherein the first detection transistor is conducted in response to the driving signal; and
a second detection transistor, comprising:
a first terminal, coupled to the data line;
a second terminal, coupled to the first terminal of the first detection transistor; and
a control terminal, configured to receive the detection control signal, wherein the second detection transistor is conducted in response to the detection control signal.

9. A pixel detection device, comprising:
a signal line;
a pixel circuit, coupled to a system high voltage source, a system low voltage source and a first reference voltage source; and
a detection circuit, coupled to the signal line, the pixel circuit and the first reference voltage source, and configured to receive a first driving signal and a detection control signal, wherein the detection circuit forms a first detection loop with the first reference voltage source, the pixel circuit and the signal line, so as to detect whether the pixel circuit is abnormal according to the first driving signal and the detection control signal in a first stage, wherein the detection circuit forms a second detection loop with the system low voltage source, the pixel circuit and the signal line, so as to detect whether the pixel circuit is abnormal according to the first driving signal in a second stage.

10. The pixel detection device of claim 9, wherein the pixel circuit comprises:
a first node;
a second node;
a third node;
a fourth node; and
a light emitting element, configured to emit light according to a driving current of the pixel circuit, wherein the light emitting element comprises:
a first terminal, coupled to the system high voltage source; and
a second terminal, coupled to the first node.

11. The pixel detection device of claim 10, wherein the detection circuit forms a third detection loop with the system high voltage source, the light emitting element and the signal line, so as to detect whether the light emitting element is abnormal according to the first driving signal in a third stage.

12. The pixel detection device of claim 10, wherein the pixel circuit further comprises:

a driving transistor, comprising:

a first terminal, coupled the first node;

a second terminal, coupled to the second node; and a control terminal, coupled to the third node, and configured to drive the light emitting element according to a voltage level of the third node, wherein the first node, the second node and the third node are not a same point;

a first transistor, comprising:

a first terminal, coupled to the first reference voltage source, and configured to receive a first reference voltage of the first reference voltage source;

a second terminal, coupled to the first node; and a control terminal, configured to receive a control signal, wherein the first transistor is conducted in response to the control signal; and a second transistor, comprising:

a first terminal, coupled to the driving transistor;

a second terminal, coupled to the system low voltage source; and a control terminal, configured to receive a second driving signal, wherein the second transistor is conducted in response to the second driving signal.

13. The pixel detection device of claim 12, wherein the pixel circuit further comprises:

a reset circuit, coupled to the third node and a second reference voltage source, and configured to reset the third node to a second reference voltage of the second reference voltage source, so as to reset the first node and the second node through the driving transistor, wherein the reset circuit comprises:

a third transistor, comprising:

a first terminal, coupled to the third node;

a second terminal, coupled to the second reference voltage source; and a control terminal, configured to receive a reset signal, wherein the third transistor is configured to reset the third node in response to the reset signal; and a fourth transistor, comprising:

a first terminal, coupled to the fourth node;

a second terminal, coupled to the second reference voltage source; and a control terminal, configured to receive the reset signal, wherein the fourth transistor is conducted in response to the reset signal.

14. The pixel detection device of claim 13, wherein the pixel circuit further comprises:

a compensation circuit, coupled to the second node, the third node and the reset circuit, and configured to a receive a compensation signal, so as to compensate the third node according to the compensation signal, wherein the compensation circuit comprises:

a fifth transistor, comprising:

a first terminal, coupled to the second node;

a second terminal, coupled to the third node; and a control terminal, configured to receive the compensation signal, wherein the fifth transistor is conducted in response to the compensation signal; and a sixth transistor, comprising:

a first terminal, coupled to the fourth node;

a second terminal, coupled to the second reference voltage source; and a control terminal, configured to receive the compensation signal, wherein the sixth transistor is conducted in response to the compensation signal.

15. The pixel detection device of claim 14, wherein the pixel circuit further comprises:

a writing circuit, coupled to the fourth node and a data line, and configured to receive a data voltage of the data line for writing into the third node and the fourth node, wherein the writing circuit comprises:

a seventh transistor, comprising:

a first terminal, coupled to the fourth node;

a second terminal, coupled to the data line; and a control terminal, configured to receive a writing signal, wherein the seventh transistor is conducted in response to the writing signal.

16. The pixel detection device of claim 15, wherein the signal line is different from the data line.

17. The pixel detection device of claim 10, wherein the detection circuit comprises:

a first detection transistor, comprising:

a first terminal, coupled to the signal line;

a second terminal, coupled to the second node; and a control terminal, configured to receive the first driving signal, wherein the first detection transistor is conducted in response to the first driving signal; and a second detection transistor, comprising:

a first terminal, coupled to the first reference voltage source;

a second terminal, coupled to the first node; and a control terminal, configured to receive the detection control signal, wherein the second detection transistor is conducted in response to the detection control signal.

18. The pixel detection device of claim 9, wherein the signal line is configured to receive a first detection signal of the first detection loop, so as to detect whether the pixel circuit is abnormal according to the first driving signal and the detection control signal in the first stage, and is configured to receive a second detection signal of the second detection loop, so as to detect whether the pixel circuit is abnormal according to the first driving signal.

19. A pixel detection method, adapted to a pixel detection device, wherein the pixel detection device comprises a signal line, a pixel circuit and a detection circuit, wherein the pixel circuit is coupled to a system high voltage source, a system low voltage source and a first reference voltage source, wherein the detection circuit is coupled to the signal line and the pixel circuit, wherein the pixel detection method comprises:

inputting a first detection signal to the pixel circuit by the first reference voltage source in a first stage;

receiving the first detection signal by the detection circuit and the signal line in the first stage, so as to determine whether the pixel circuit is abnormal according to the first detection signal;

inputting a second detection signal to the pixel circuit by the first reference voltage source in a second stage; and receiving the second detection signal by the detection circuit and the signal line in the second stage, so as to determine whether the pixel circuit is abnormal according to the second detection signal.

20. The pixel detection method of claim 19, wherein the pixel circuit comprises a light emitting element, the light emitting element is coupled between the system high voltage source and the system low voltage source, wherein the pixel detection method further comprises:

inputting a third detection signal to the light emitting element of the pixel circuit by the system high voltage source in a third stage; and receiving the third detection signal by the detection circuit and the signal line in the third stage, so as to determine whether the light emitting element is abnormal according to the third detection signal.

* * * * *